US009817962B2

United States Patent
Eonnet

(10) Patent No.: US 9,817,962 B2
(45) Date of Patent: Nov. 14, 2017

(54) MODULE FOR MANAGING A TRANSACTION BETWEEN A TERMINAL AND AN ELECTRONIC DEVICE

(75) Inventor: Yves Eonnet, Paris (FR)

(73) Assignee: TAGATTITUDE, Rocquencourt (FR)

(*) Notice: Subject to any disclaimer, the term of this patent is extended or adjusted under 35 U.S.C. 154(b) by 0 days.

(21) Appl. No.: 14/114,425

(22) PCT Filed: Apr. 25, 2012

(86) PCT No.: PCT/FR2012/050904
§ 371 (c)(1),
(2), (4) Date: Jan. 27, 2014

(87) PCT Pub. No.: WO2012/146871
PCT Pub. Date: Nov. 1, 2012

(65) Prior Publication Data
US 2014/0137209 A1   May 15, 2014

(30) Foreign Application Priority Data
Apr. 29, 2011  (FR) ...................................... 11 53669

(51) Int. Cl.
*G06F 21/00*      (2013.01)
*G06F 21/35*      (2013.01)

(52) U.S. Cl.
CPC .................... *G06F 21/35* (2013.01)

(58) Field of Classification Search
None
See application file for complete search history.

(56) References Cited

U.S. PATENT DOCUMENTS

| | | | |
|---|---|---|---|
| 5,787,154 A * | 7/1998 | Hazra et al. | 379/93.03 |
| 6,961,850 B1 * | 11/2005 | Stebbings | G10L 19/018 |
| | | | 704/E19.009 |
| 7,167,562 B2 * | 1/2007 | Milgram | G06F 21/78 |
| | | | 380/201 |

(Continued)

FOREIGN PATENT DOCUMENTS

FR          2 898 238         9/2007

OTHER PUBLICATIONS

International Search Report dated Jul. 10, 2012 from International Application No. PCT/FR2012/050904 filed Apr. 25, 2012, pp. 1-11.

*Primary Examiner* — Maung Lwin
(74) *Attorney, Agent, or Firm* — MH2 Technology Law Group, LLP

(57) ABSTRACT

A transaction module can be incorporated in a terminal for authorizing a transaction between a first application resident in the terminal and a second application resident in an electronic device. The module may include code-obtaining means for obtaining a code; an interface with a communications means of the terminal enabling a validation request including the code to be sent to a secure server; means for generating an audio signal from the code; an interface with a module of the terminal suitable for sending the audio signal to a loudspeaker of the terminal in order to play it back; and means for authorizing the transaction on receiving a validation message from the secure server. The validation message may be representative of the secure server receiving the code from the electronic device.

17 Claims, 4 Drawing Sheets

(56) References Cited

U.S. PATENT DOCUMENTS

| | | | |
|---|---|---|---|
| 8,532,612 B1* | 9/2013 | Holzhey | G06Q 20/123 |
| | | | 455/405 |
| 2002/0031227 A1* | 3/2002 | Milgram | 380/256 |
| 2005/0178829 A1* | 8/2005 | Rosenberg | 235/380 |
| 2005/0262555 A1* | 11/2005 | Waterland | G06F 21/36 |
| | | | 726/21 |
| 2007/0022021 A1* | 1/2007 | Walker | G06Q 10/02 |
| | | | 705/5 |
| 2007/0143230 A1* | 6/2007 | Narainsamy et al. | 705/75 |
| 2007/0181675 A1* | 8/2007 | Drummond | G06K 7/0004 |
| | | | 235/381 |
| 2007/0190975 A1* | 8/2007 | Eonnet | 455/411 |
| 2007/0277243 A1* | 11/2007 | Horii | G06F 21/10 |
| | | | 726/26 |
| 2008/0109657 A1* | 5/2008 | Bajaj | H04L 9/3213 |
| | | | 713/168 |
| 2009/0061888 A1* | 3/2009 | Eonnet et al. | 455/450 |
| 2009/0187492 A1* | 7/2009 | Hammad | G06Q 10/087 |
| | | | 705/26.1 |
| 2010/0017334 A1* | 1/2010 | Itoi | G06Q 20/02 |
| | | | 705/71 |
| 2010/0324727 A1* | 12/2010 | Eonnet | 700/237 |
| 2011/0255690 A1* | 10/2011 | Kocher | G06F 21/10 |
| | | | 380/210 |
| 2011/0258121 A1* | 10/2011 | Kauniskangas | G06Q 20/20 |
| | | | 705/67 |
| 2012/0011007 A1* | 1/2012 | Blewett | G06Q 20/20 |
| | | | 705/16 |
| 2012/0172018 A1* | 7/2012 | Metivier | 455/414.1 |

\* cited by examiner

MODULE FOR MANAGING A TRANSACTION BETWEEN A TERMINAL AND AN ELECTRONIC DEVICE

CROSS-REFERENCE TO RELATED APPLICATIONS

This application is a U.S. National Stage application of International Application No. PCT/FR2012/050904 filed Apr. 25, 2012, which claims priority to French Application No. 1153669 filed Apr. 29, 2011, the entire disclosures of which are hereby incorporated by reference in their entireties.

BACKGROUND OF THE INVENTION

The present invention lies in the field of communications terminals, and in particular in the field of smart terminals commonly known as smartphones.

Such terminals have recently become very widespread and they offer their users the option of installing numerous applications known as resident applications.

Some such applications can be used for undertaking a transaction with the resident application of another electronic device.

In this document, the term "transaction" is used to mean any exchange of information for the purpose of obtaining an agreement between the resident applications of the terminals, under the authority of a secure server, sometimes also referred to as a "trusted" server.

In the present state of the art, a major brake on deploying such transactions between terminals is undeniably due to the fact that there is no simple technique for establishing such transaction mechanisms, i.e. a technique that can be applied in the same way to any type of resident application, regardless of its context.

Furthermore, and in highly detrimental manner, presently known techniques require the two terminals that are parties to the transaction to run the same application for managing the transaction, or at least to run applications that are compatible.

The invention makes it possible to solve the above-mentioned drawbacks.

OBJECT AND SUMMARY OF THE INVENTION

More particularly, in a first aspect, the invention provides a transaction module suitable for incorporating in a terminal for authorizing a transaction between a first application resident in the terminal and a second application resident in an electronic device, the module comprising:
  code-obtaining means for obtaining a code;
  an interface with the communications means of the terminal enabling a validation request including the code to be sent to a secure server;
  means for generating an audio signal from the code;
  an interface with a module of the terminal suitable for sending the audio signal to a loudspeaker of the terminal in order to play it back; and
  means for authorizing the transaction on receiving a validation message from the secure server, the message being representative of the secure server receiving the code from the electronic device.

Thus, and in general, the transaction between the terminal and the electronic device is validated by the secure server as soon as it receives the same code from each of those entities.

In accordance with the invention:
  the code is sent by the terminal to the secure server in digital form;
  the code is converted into an audio signal by the terminal (modulation), delivered by the loudspeaker of the terminal, and picked up by the microphone of the electronic device; and
  the code is sent by the electronic device to the secure server either in audio form, i.e. as picked up by the microphone, or else converted into digital form, when the electronic device incorporates a demodulation function or recording means.

In most advantageous manner, the demodulation can thus be performed by the secure server. In this embodiment, the only means required by the electronic device are the microphone for picking up the audio signal and communications means for communicating with the secure server in order to send it the audio signal. Consequently, the electronic device that is a party to the transaction may be a conventional mobile telephone.

In an embodiment, the terminal includes generator means for generating the code and the code-obtaining means of the transaction module obtain the code from the generator means.

In an embodiment, the code-obtaining means of the transaction module include an interface with a memory constituting a supply of codes.

The memory may be internal or external to the terminal. In one embodiment, a limited number of codes is installed by a server in an internal memory of the terminal, giving it the possibility to undertake only a limited number of transactions. In another embodiment, the terminal has access to codes generated by a trusted server, with this taking place under determined conditions that do not form the subject matter of this patent.

In an embodiment, the transaction module has a software interface with the first resident application, the software interface including a function used by the first resident application for requesting authorization of the transaction, and a function enabling the first resident application to receive a value representative of the authorization of the transaction by the electronic device and of the validation of this transaction by the secure server.

It is considered that the fact of the audio signal being received by the electronic device constitutes proof that the user of the electronic device has authorized the transaction, since the user has had to place the electronic device at a very short distance from the loudspeaker of the terminal.

Attention is given below to the viewpoint of the other party to the transaction.

As mentioned above, the electronic device of the other party need not necessarily include means for demodulating the audio signal picked up by its microphone.

Thus, in a second aspect, the invention provides a transaction module suitable for being incorporated in the electronic device to authorize a transaction between a first application resident in the electronic device and a second application resident in a terminal, the module comprising:
  an interface for receiving an audio signal picked up by a microphone of the electronic device, the audio signal being sounded by a loudspeaker of the terminal;
  means suitable for generating a code from the audio signal; and
  an interface with communications means of the electronic device for enabling the code to be sent to a secure server for the purpose of having the transaction authorized.

In a third aspect, the invention provides a transaction module suitable for incorporating in an electronic device to authorize a transaction between a first application resident in the electronic device and a second application resident in a terminal, the module comprising:
- an interface for receiving an audio signal picked up by a microphone of the electronic device, the audio signal being sounded by a loudspeaker of the terminal;
- means suitable for detecting a first portion of the audio signal; and
- an interface with communications means of the terminal for enabling the recording of a second portion of the audio signal as recorded following said detection to be sent to a secure server for the purpose of having the transaction authorized.

In an embodiment of the transaction module in this second or third aspect, the module includes a software interface with the first resident application, the software interface including a function used by the first resident application for requesting the transaction module to authorize the transaction.

The invention also provides a transaction module that incorporates the means of a transaction module of the first aspect and the means of a transaction module of the second or the third aspect.

BRIEF DESCRIPTION OF THE DRAWINGS

Other characteristics and advantages of the invention appear from the following description made with reference to the accompanying drawings which show an embodiment having no limiting character.

DETAILED DESCRIPTION OF A FIRST EMBODIMENT OF THE INVENTION

Figure 1:
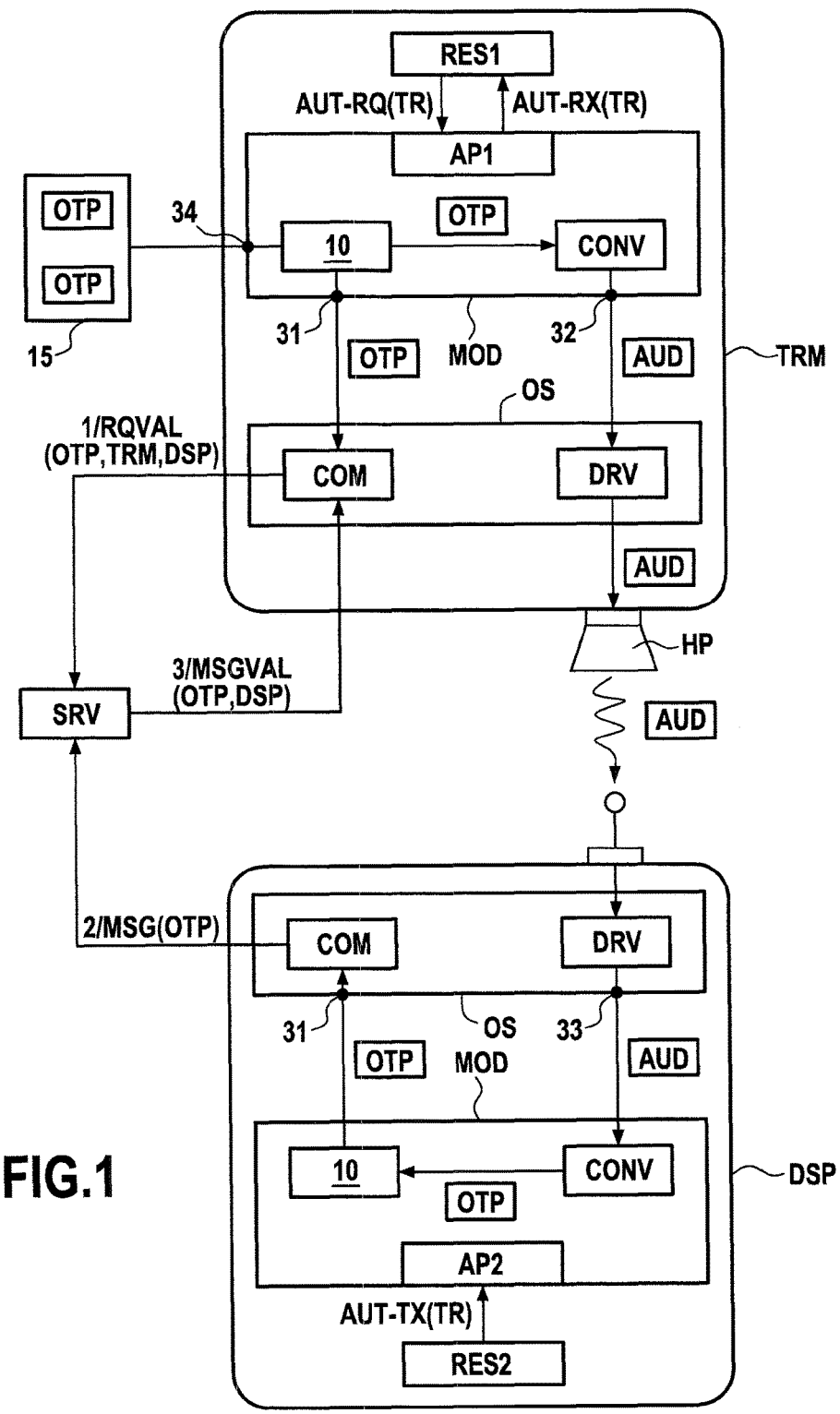
FIG. 1 shows a transaction between two intelligent smartphones incorporating transaction modules in accordance with a first embodiment of the invention.

FIG. 1 shows two smartphones TRM and DSP.

The smartphone TRM constitutes a terminal in the meaning of the invention.

The smartphone DSP constitutes an electronic device in the meaning of the invention.

Each of these smartphones TRM, DSP includes a transaction module MOD in accordance with the invention.

The transaction module MOD interfaces mainly with a software application RES1, RES2 that is resident in the smartphones TRM, DSP.

It also interfaces with an operating system OS of the smartphones.

More precisely, in the presently-described embodiment, it interfaces with communications means COM of the smartphone and with software drivers DRV suitable for controlling the peripherals of the smartphone, and more precisely a loudspeaker HP in the smartphone TRM and a microphone MIC in the smartphone DSP.

In the presently-described embodiment, the transaction module MOD also includes a software interface making it easy to develop resident applications RES1, RES2 and to interface with the transaction module.

More precisely, in the presently-described embodiment:
- the transaction module MOD of the smartphone TRM offers a software interface AP1 with the first resident application RES1, this interface having two functions AUT_RQ and AUT_RX that can be used by the first resident function RES1, the function AUT_RQ for requesting authorization of a transaction, and the function AUT_RX for receiving a value representative of the authorization of the transaction by the smartphone DSP and of this transaction being validated by a secure severe SRV; and
- the transaction module MOD of the smartphone DSP offers a software interface AP2 for the resident application RES2, the interface including a function AUT_TX that is used by the resident application to request the transaction module MOD to authorize the transaction.

The communications modules COM included in the operating systems OS of each of the smartphones TRM, DSP are suitable for communicating with the above-mentioned secure server SRV.

In preferred manner, the smartphones TRM, DSP and the secure communications server SRV communicate via a mobile telecommunications network.

There follows a detailed explanation of how a transaction TR can be undertaken between the applications RES1, RES2 that are resident in the smartphones TRM and DSP, in co-operation with the secure server SRV.

In this example, it is assumed that the module terminal TRM has an interface 34 for obtaining codes OTP stored in a storage unit 15.

In this example, these codes are generated by a trusted server, not shown.

In any event, each of the codes is unique. It may preferably be designed so as to be used once only: these codes are referred to as one time passwords (OTPs).

In this example it is assumed that the resident applications RES1, RES2 are preparing to undertake a transaction and have already established dialog, possibly exchange of information, which does not properly speaking form part of the invention.

In order to request authorization of the transaction TR the resident application RES1 of the smartphone TRM uses the software application AUT_RQ provided by the programming interface AP1 of the module MOD.

By means of the transaction module MOD of the smartphone TRM, this function causes a code OTP to be obtained from the memory 15 via the interface 34.

This code OTP is sent by the communications means COM of the operating system OS of the smartphone TRM to the secure server SRV in a validation request RQVAL. In FIG. 1, the interface between the transaction module MOD and the communications means COM is given reference 31.

In the presently-described embodiment, the validation request RQVAL also includes the identifiers TRM, DSP of the smartphones TRM, DSP.

The transaction module MOD of the smartphone TRM then converts the code OTP into an audio signal AUD. For this purpose it uses means that are provided for conversion CONV.

The transaction module MOD of the smartphone TRM sends the audio signal AUD to a loudspeaker HP of this telephone in order to play it back. In FIG. 1, the interface between the transaction module MOD and the software drivers DRV controlling the loudspeaker is given reference 32.

To undertake the transaction, the smartphones TRM and DSP need to be sufficiently close together, e.g. being positioned "head-to-tail" so that the audio signal AUD played back by the loudspeaker HP of the smartphone TRM is picked up by the microphone MIC of the smartphone DSP.

When this applies, the software driver DRV of the operating system OS of the smartphone DSP in charge of controlling the microphone conveys this audio signal AUD to the transaction module MOD of the telephone.

In FIG. 1, the interface between the transaction module MOD and the software drivers DRV controlling the microphone is given reference 33.

In the presently-described embodiment, the conversion means CONV of the transaction module MOD converts the audio signal AUD so as to regenerate the code OTP (demodulation).

In this example, it is assumed that the resident function RES2 has acted via the software interface AP2 to request the transaction module MOD to authorize the transaction TR by using the application AUT_TX.

Consequently, the transaction module MOD of the smartphone DSP uses the interface 31 to cause a message MSG to be sent to the secure server SRV, the message MSG including the code OTP obtained by converting the audio signal AUD received via the acoustic channel set up between the loudspeaker HP and the microphone MIC.

The secure server SRV can then verify that the code OTP received from the first smartphone TRM is identical to that received from the second smartphone DSP, with this identity representing acceptance by the smartphone DSP of the transaction proposed by the smartphone TRM.

Consequently, the secure server SRV sends a validation message MSGVAL to the smartphone TRM.

In the presently-described embodiment, this validation message MSGVAL includes the code OTP and the identity DSP of the smartphone DSP.

This message is received by the transaction module MOD of the smartphone TRM via the interface 31. The function AUT_RX accessible via the software interface AP1 of the transaction module MOD then returns to the resident function RES1 a value that is representative of the transaction TR being authorized by the smartphone DSP and of the validation of this transaction by the secure sever SRV.

DETAILED DESCRIPTION OF A SECOND EMBODIMENT OF THE INVENTION

Figure 2:
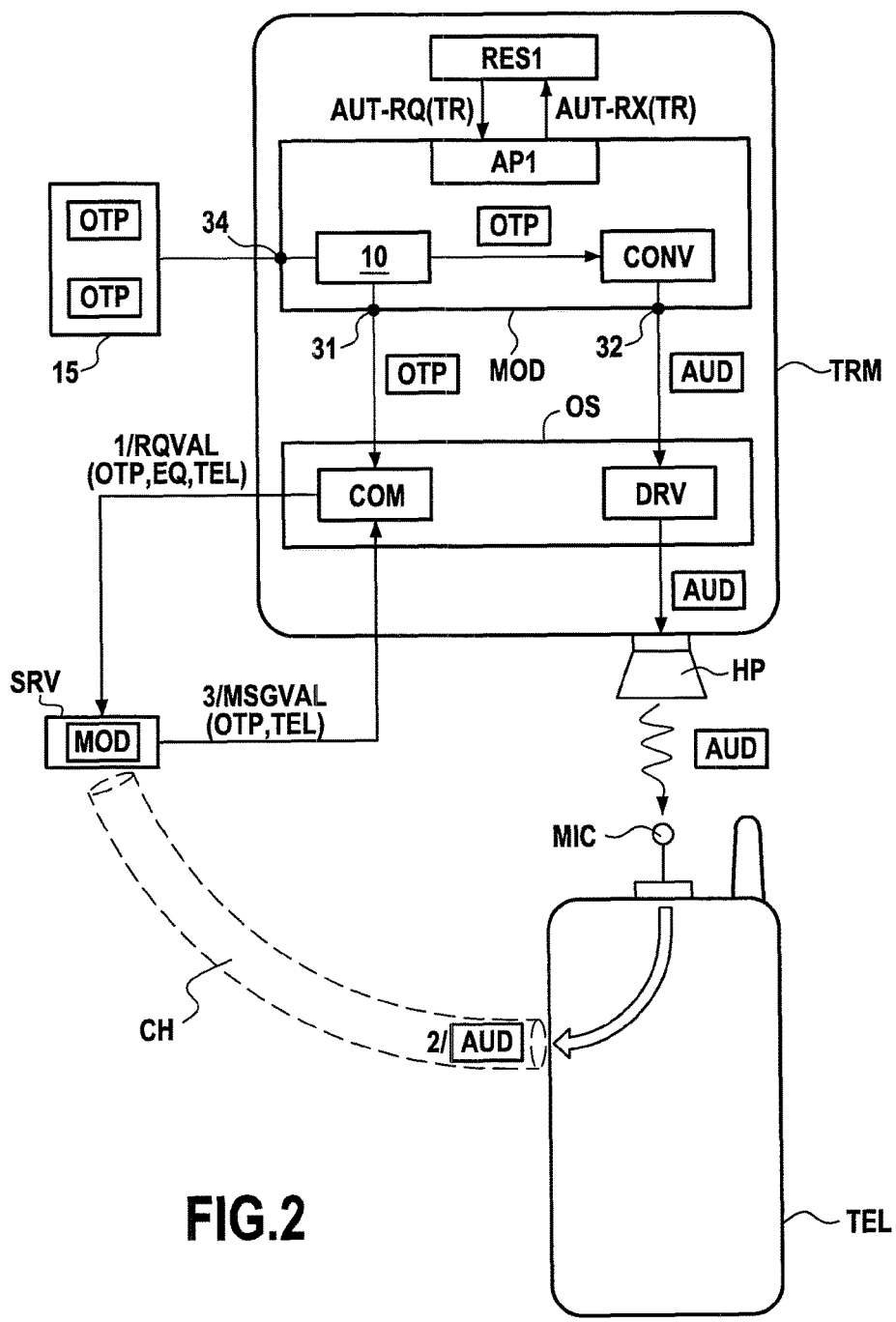
FIG. 2 shows a transaction between a FIG. 1 smartphone and a conventional mobile telephone.

FIG. 2 shows a smartphone TRM and a conventional mobile telephone TEL that operates in accordance with the GSM standard.

The smartphone TRM described with reference to this figure is identical to that described with reference to FIG. 1.

The mobile telephone TEL does not have a transaction module MOD in accordance with the invention.

In this second embodiment, the transaction module MOD in accordance with the invention is included in the secure server SRV.

In this second embodiment, when the server SRV receives the validation request RQVAL including a code OTP of the smartphone TRM and the number of the conventional telephone TEL, it establishes a GSM communications channel CH with the conventional telephone TEL.

This communications channel enables the secure server SRV to receive the audio signal AUD picked up by the microphone MIC of the conventional telephone TEL.

In the presently-described embodiment, the transaction module MOD of the secure server converts the audio signal AUD in order to generate the code OTP.

The secure server SRV is then in a position to verify that the code OTP that it has received from the telephone TEL in audio form AUD over the GSM channel CH does indeed correspond to the code that it has received from the smartphone TRM in the validation request RQV.

This correspondence demonstrates that the telephones TEL and TRM are close to each other, which constitutes proof that the user of the conventional telephone TEL accepts the transaction proposed by the smartphone TRM.

DETAILED DESCRIPTION OF THE THIRD EMBODIMENT OF THE INVENTION

Figure 3:
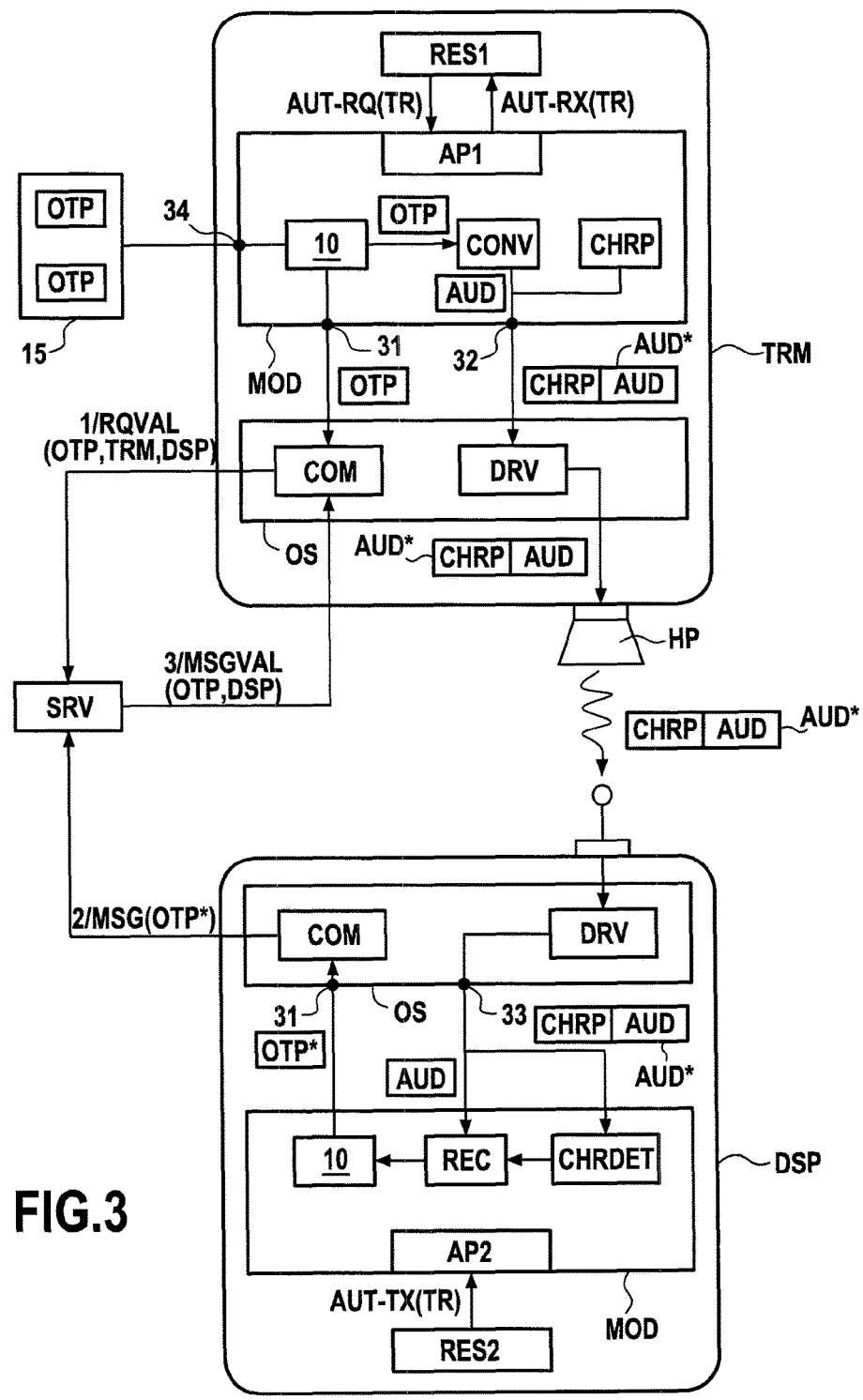
FIG. 3 shows a transaction between two smartphones incorporating transaction modules in accordance with a second embodiment of the invention.

FIG. 3 shows two mobile telephones TRM, DSP in accordance with another embodiment of the invention.

The mobile telephone TRM differs from that described with reference to FIG. 1 in that its transaction module MOD generates a two-portion audio signal AUD* constituted by a first audio signal portion CHRP and by a second audio signal portion AUD.

The first portion CHRP is a predetermined audio signal that is very easy to recognize.

The second portion AUD corresponds to the conversion of the code OTP, as in the example of FIG. 1.

The smartphone DSP differs from that of FIG. 1 in that its transaction module includes a detection module CHRDET suitable for detecting the first audio signal portion CHRP when a two-portion audio signal AUD* is picked up by the microphone MIC.

Once this detection has taken place, the detection unit CHRDET controls recording means REC of the transaction module MOD so that they record the second portion AUD of the signal AUD*, with the recording, referenced OTP*, being communicated to the secure server SRV in order to validate the transaction.

The secure server SRV is thus in a position to verify that the code OTP received from the first smartphone TRM does indeed correspond to the recording OTP* received from the second smartphone DSP, this correspondence being representative of the smartphone DSP accepting the transaction proposed by the smartphone TRM.

The invention may be used for any type of transaction, the interface of the transaction module MOD with the resident applications RES1, RES2 being generic.

In the embodiments described in FIGS. 1 to 3, the function of requesting authorization of a transaction (performed by the terminal TRM) is described as being separate from the function of authorizing the transaction (performed by the electronic device DSP).

Naturally, in practice, the transaction modules MOD are capable of performing both functions.

Figure 4:
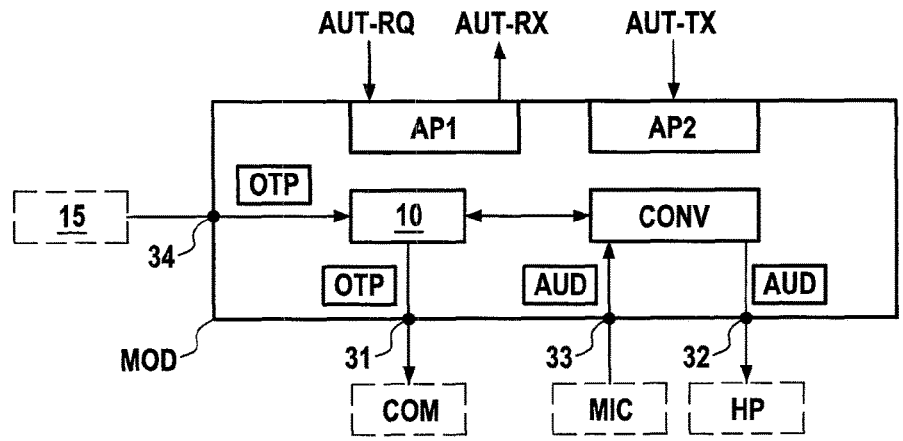
FIGS. 4 and 5 show communications modules in two particular embodiments of the invention.

To this end, FIG. 4 shows a transaction module in a first preferred embodiment of the invention.

In this example, the transaction module comprises an interface 31 with the communications means of an electronic device or of a terminal, means 33 for interfacing with a microphone, means 32 for interfacing with a loudspeaker, means for converting an audio signal into a code OTP, and vice versa, an interface 34 for receiving a code OTP, and software interfaces AP1, AP2 with the applications resident in the electronic device or the terminal.

Figure 5:
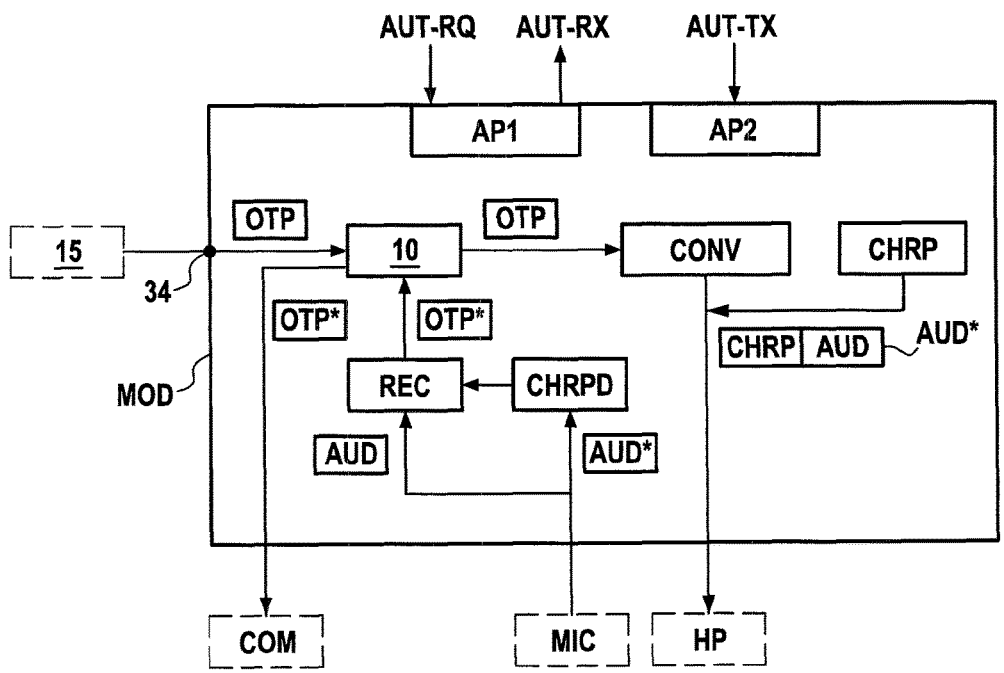

FIG. 5 shows a transaction module in a second preferred embodiment of the invention.

This transaction module differs from that of FIG. 4 in that the conversion module CONV provides only the modulation portion but not the conversion of the audio signal received by the microphone MIC into a code OTP. It includes means CHRDET for detecting the first portion of the audio signal and recording means REC for recording the second portion of the audio signal, this recording being sent to the secure server by the electronic device DSP incorporating it with which it communicates via the interface 31.

In the above description, the data exchanged between the terminal TRM and the server SRV is constituted by the code OTP and the identifiers DSP, TRM.

Only the code OTP is absolutely essential. In certain applications, the identifiers TRM and/or DSP need not be communicated.

Depending on the application selected, other types of data may be conveyed, and in particular the amount of a transaction, rights, access codes, passwords, cryptographic keys, or more generally any parameter that is useful for the transaction in question.

In an embodiment, the server SRV maintains a database in which it enters the identifiers of pieces of equipment that incorporate a transaction module MOD in the meaning of the invention. This enables the server spontaneously to set up a GSM communications channel CH with the electronic device DSP, as in the example of FIG. 2, when that electronic device does not include a module MOD.

It should be observed that the transaction module MOD may be incorporated in electronic devices or terminals of any type: mobile communications terminals, cash registers, NFC terminals, smart cards, SIM cards, . . . .

The transaction module MOD may also be incorporated in a lock, the transaction between the lock and the electronic device DSP then being a request to open a door, which request is subjected to validation by the secure server SRV.

The invention claimed is:

1. A non-transitory computer readable medium in a terminal for authorizing a transaction between a first application resident in the terminal and a second application resident in an electronic device, the non-transitory computer readable medium including instructions that are executed by a processor to perform operations comprising:
   obtaining a one time password;
   transmitting a validation request to a secure server, the validation request comprising the one time password;
   generating an audio signal from the one time password;
   interfacing with said terminal to send a two-portion audio signal that comprises the audio signal and a predetermined signal configured for easy recognition and separate detection by the electronic device to a loudspeaker of the terminal that plays the two-portion audio signal, wherein the two-portion audio signal is received by the electronic device, the predetermined signal is detected by the electronic device, the audio signal is recorded in response to detecting the predetermined signal, the audio signal is converted to generate the one time password, and the one time password is sent by the electronic device to the secure server; and
   authorizing the transaction upon receiving a validation message from the secure server, the validation message sent by the secure server in response to verifying that the one time password received from the terminal is identical to the one time password received from the electronic device.

2. The non-transitory computer readable medium according to claim 1, wherein obtaining the one time password includes obtaining the one time password from a memory that includes a reservoir of one time passwords.

3. The non-transitory computer readable medium according to claim 1, the operations further comprising:
   interfacing with the first application, said interfacing including invoking a first function used by the first application to request authorization of the transaction, and a second function enabling the first application to receive a value representative of the authorization of the transaction by the electronic device and of the validation of the transaction.

4. The non-transitory computer readable medium according to claim 1, wherein the audio signal is demodulated by the electronic device to generate the one time password before the one time password is sent by the electronic device to the secure server.

5. The non-transitory computer readable medium according to claim 1, wherein the electronic device sends the one time password to the secure server by sending the audio signal that was received to the secure server, and the audio signal is converted to generate the one time password by the secure server demodulating the audio signal to generate the one time password after the electronic device sends the audio signal to the secure server.

6. A method for authorizing a transaction between a first application resident in an electronic device and a second application resident in a terminal, the method comprising:
   receiving an audio signal by a microphone of the electronic device, the audio signal having been played by a loudspeaker of the terminal;
   detecting a first portion of the audio signal, wherein the first portion of the audio signal is predetermined and configured for easy recognition and separate detection by the electronic device;
   recording the second portion of the audio signal in response to detecting the first portion;
   converting the second portion of the audio signal into a one time password; and
   transmitting the one time password to a secure server, wherein the secure server sends a validation message to the terminal in response to verifying that the one time password received from the electronic device is identical to a one time password received from the terminal to authorize the transaction.

7. The method according to claim 6, further comprising:
   interfacing with the first application, the interfacing including invoking a function used by the first application to request authorization of the transaction.

8. The method according to claim 7, wherein interfacing with the first application further comprises:
   invoking a second function enabling the first application to receive a value representative of the authorization of the transaction by the electronic device and of the validation of the transaction.

9. The method according to claim 6, wherein the one time password is obtained by the terminal from a memory that includes a reservoir of one time passwords.

10. The method according to claim 6, wherein converting the second portion of the audio signal into the one time password comprises:
   demodulating the second portion of the audio signal to generate the one time password before the one time password is transmitted to the secure server.

11. The method according to claim 6, wherein transmitting the one time password to the secure server comprises:

sending the second portion of the audio signal to the secure server, wherein the secure server converts the second portion of the audio signal to generate the one time password by demodulating the second portion of the audio signal to generate the one time password.

12. A non-transitory computer readable medium in an electronic device for authorizing a transaction between a first application resident in the electronic device and a second application resident in a terminal, the non-transitory computer readable medium including instructions that are executed by a processor to perform operations comprising:
  receiving an audio signal by a microphone of the electronic device, the audio signal being played by a loudspeaker of the terminal;
  detecting a first portion of the audio signal, wherein the first portion of the audio signal is predetermined and configured for easy recognition and separate detection by the electronic device;
  recording a second portion of the audio signal in response to detecting the first portion;
  converting the second portion of the audio signal into a one time password; and
  transmitting the one time password to a secure server, wherein the secure server sends a validation message to the terminal in response to verifying that the one time password received from the electronic device is identical to a one time password received from the terminal to authorize the transaction.

13. The non-transitory computer readable medium according to claim 12, the operations further comprising:
  interfacing with the first application, the interfacing including invoking a function used by the first application to request authorization of the transaction.

14. The non-transitory computer readable medium according to claim 13, wherein interfacing with the first application further comprises:
  invoking a second function enabling the first application to receive a value representative of the authorization of the transaction by the electronic device and of the validation of the transaction.

15. The non-transitory computer readable medium according to claim 12, wherein the one time password is obtained by the terminal from a memory that includes a reservoir of one time passwords.

16. The non-transitory computer readable medium according to claim 12, wherein converting the second portion of the audio signal into the one time password comprises:
  demodulating the second portion of the audio signal to generate the one time password before the one time password is transmitted to the secure server.

17. The non-transitory computer readable medium according to claim 12, wherein transmitting the one time password to the secure server comprises:
  sending the second portion of the audio signal to the secure server, wherein the secure server converts the second portion of the audio signal to generate the one time password by demodulating the second portion of the audio signal to generate the one time password.

* * * * *